April 9, 1968        S. POMPINI        3,376,639
PINCHING KNIFE
Filed July 3, 1967        2 Sheets-Sheet 1
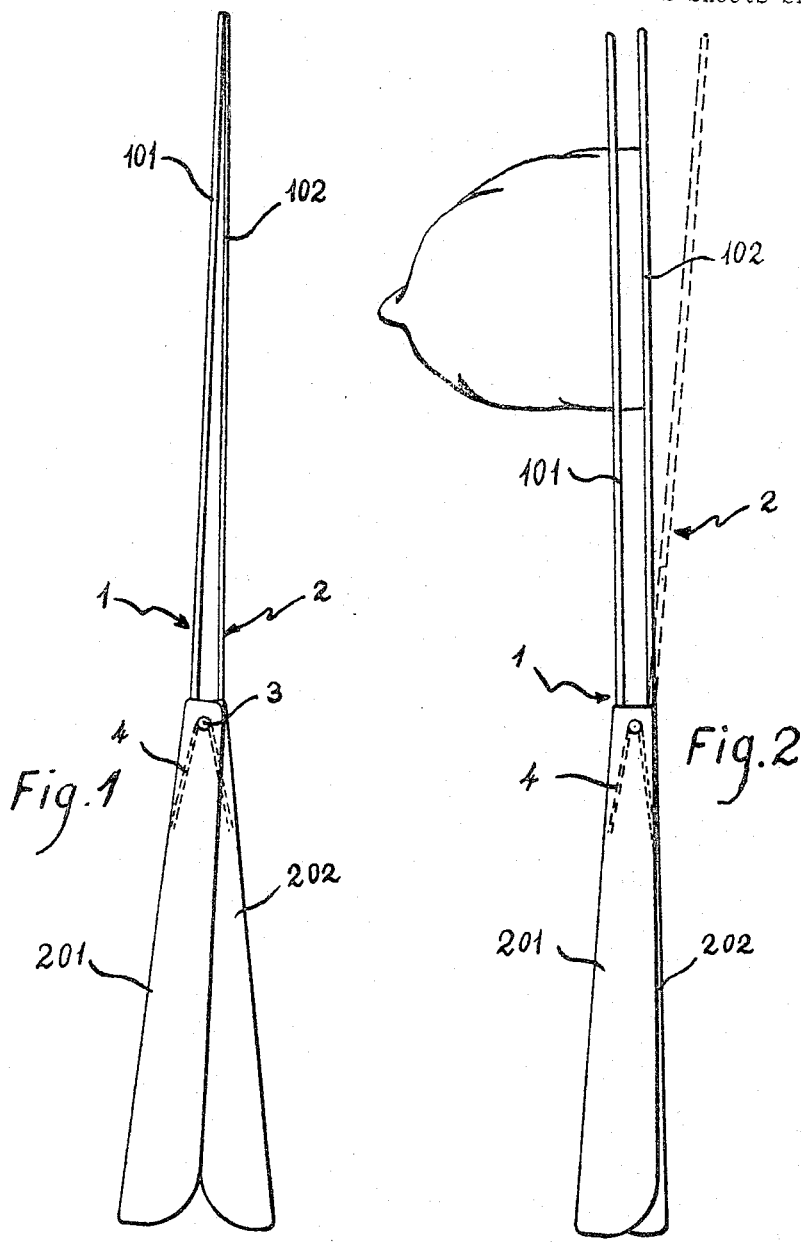
INVENTOR
Smeraldo Pompini
BY Edwin L. Greigg
ATTORNEY

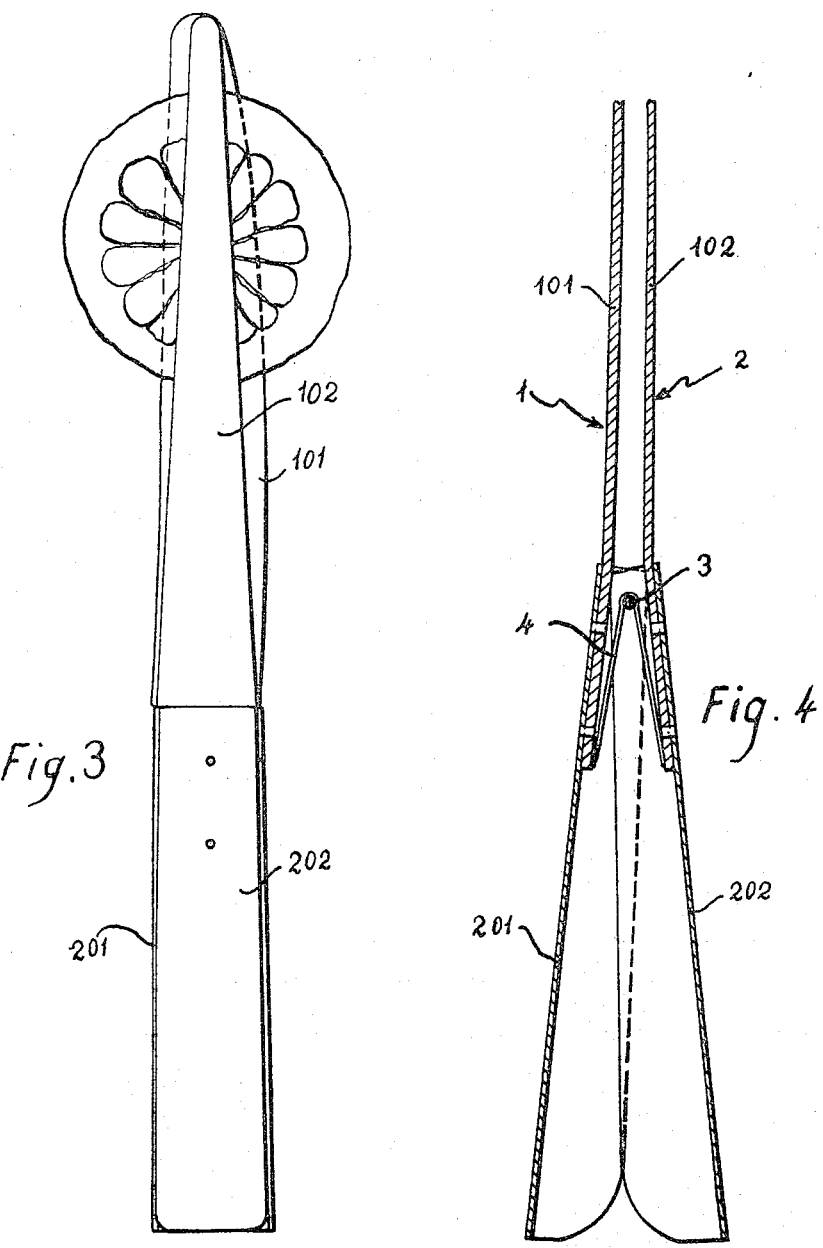

United States Patent Office 3,376,639
Patented Apr. 9, 1968

3,376,639
PINCHING KNIFE
Smeraldo Pompini, Fiorenzuola d'Arda, Piacenza, Italy, assignor to Pietro Rosa & Figli S.m.C., Udine, Italy, an unlimited partnership of Italy
Filed July 3, 1967, Ser. No. 650,692
Claims priority, application Italy, July 7, 1966, 15,415/66
10 Claims. (Cl. 30—124)

ABSTRACT OF THE DISCLOSURE

A knife for cutting out slices whilst holding same firmly until desired, comprising a slicing blade to the side of which a pinching jaw is hinged and spring-urged against the slicing blade, so as to cooperate with the blade of the knife for pinching a slice which has been previously cut by the same knife blade. The slicing blade and the pinching jaw are each provided with a handle. By pressing the said handles together, the pinching jaw is swung away from the knife blade, thus releasing the pinched slice.

---

This invention relates to a pinching knife and more particularly to a slicing knife to the side of which a pinching jaw or spatula is spring-hinged, adapted to cooperate with the blade of the knife, for pinching a slice which has been previously cut by the same knife blade.

It is often required, for example when slicing lemons, oranges (in the preparation of drinks) bread, butter or saugages (such as salami in the preparation of sandwiches) that the cut slice be picked somehow and disposed as desired. Usually therefore the serving of such slices involves two operations, i.e.: cutting the slice with a knife, and picking the cut slice with some other instrument, for example a serving fork, the point of the same knife, a stick, nippers, etc. This implies that the two operations be effected separately the one after the other, with a time interval during which the cut slice momentarily is laid on some plane (usually a dish) and usually the knife must be laid down in order to use the picking or pinching instrument.

The object of the present invention is to provide a utensil composed of knife to which a pinching jaw or other element is spring-hinged in such a manner as to be swung away or towards the knife blade at will by the user, so that the cut slice may be held by the co-acting knife blade and pinching jaw as soon as it is severed from the rest of the object to be sliced. Subsequently, the pinching jaw may be swung away from the knife blade thus releasing the slice when desired by the user. The use of the utensil thus outlined, results in a more efficient and practical single operation, which also complies with the hygienic requirements in the handling of sliced foods, particularly whenever such handling has to be effected, as in the case of restaurants, bars, or other public places, before the consumer's eyes.

According to one embodiment of the invention the utensil comprises a usual slicing knife having attached near the top part of its handle a hinge pin, co-acting with a spring on which a pinching jaw is fitted. This pinching jaw is preferably in form of a spatula having approximately the same length and a slightly lesser width than the adjacent knife blade. The spatula is also provided with a handle, whereby the spring-hinge is so constructed and mounted as to push, in rest position, the two handles apart, and consequently cause the blade and spatula to be clasped together. By pressing both handles together, the knife blade and spatula come apart, while by releasing the pressure, after having sliced the object, the slice comes to be pinched between blade and spatula and may be laid down by simply again slightly urging together the blade and spatula handles, against the hinge spring pressure.

The invention is shown in the accompanying drawings, in which:

FIGURE 1 is a view of a pinching knife, in rest position, seen from the back of the knife blade;

FIGURE 2 is a view, like to that of FIGURE 1, showing by full lines the holding blade or spatula in pinching position and by dash lines the same spatula in slice-releasing position;

FIGURE 3 is a plan view of the device in lemon slice-pinching position and

FIGURE 4 is a longitudinal section of the pinching knife in a plane at right angles to the blades and hinge pivot.

Referring particularly to FIGURES 1, 2 and 4, the pinching knife according to the invention comprises a knife 1, consisting of a blade 101 and a preferably hollow handle 201 and a pinching jaw 2 constituted of a spatula 102 and a handle 202 hinged together in correspondence of the top part of the handles 201–202 by means of a spring hinge consisting of a hinge pin 3, which traverses the wings of U-shaped parts projecting against each other from both handles and is secured in any suitable manner, for example by riveting of its ends. Upon said pin 3 a V-shaped hinge spring 4 is mounted so that it urges with its wing ends the said handles 201–202 apart and, consequently, the blades 101 and 102 together, i.e. in pinching position (see FIG. 1).

The operation is as follows:

When the handles are pressed together, the spatula 102 is swung away from the knife blade 101 and this may function as an ordinary slicing knife. To this purpose, as shown in FIGURE 3, the spatula 102, which has substantially the same length as blade 101, has a lesser width, so as not to interfere with the cutting action of the knife blade 101.

Thus, whenever it is desired to cut a slice, for example as shown in FIGURES 2 and 3, out of a lemon fruit, the user, in grasping the device, exerts a convenient inward pressure on the handles, against the action of spring 4, until the blade 101 and spatula 102 come sufficiently apart to enable the cutting of a lemon slice (see dash lines in FIGURE 2).

After the cutting has been effected, the pressure on handles 201 and 202 is released. Due to the action of spring 4, the blade 101 and spatula 102 are urged together and firmly pinch the cut slice of lemon between them (FIGURES 2 and 3). When desired, thereafter the cut slice may be released by again pressing together the handles 102 and 202.

While a preferred embodiment of the invention has been described and shown, many modifications thereof can be made by one skilled in the art without departing from the spirit of the invention.

Thus instead of a spring hinge composed of a pin and a V-shaped spring blade, any other system of spring hinge adopted in like small household utensils may be employed (helical pressure or torsion spring and the like) and instead of providing a pair of interengaging hollow handles, the handles may be provided with interengaging pairs of projecting lugs, through which the hinge pin may be mounted.

That which is claimed is:

1. A pinching knife comprising a substantially flat elongate slicing blade having a sharp cutting edge and a handle, and a substantially flat elongate pinching blade having a handle, said pinching blade being substantially longitudinally aligned with said slicing blade, the cutting edge of said slicing blade extending beyond a corresponding edge of said pinching blade to prevent the pinching blade from interfering with the cutting action of the slicing blade, said pinching blade handle being pivotally connected to said slicing blade handle, resilient means urging said pinching blade toward one face of the slicing blade while said pinching blade handle is urged away from said slicing blade handle, whereby pressing the handles together the pinching blade is pivoted away from the slicing blade and by releasing the handles the pinching blade is urged in the direction of said slicing blade so that when a slice of comestible is adherent to the slicing blade, it becomes pinched between one face of the pinching blade and said one face of the slicing blade and may be set free by pressing the handles together.

2. A pinching knife according to claim 1, wherein the slicing blade handle and the pinching blade handle have corresponding parts projecting in the direction of one another, a pivot pin mounted through said projecting parts, and said resilient means including a spring mounted between said handles and bearing against said handles beneath said pivot pin, so as to urge said pivoted handles apart.

3. A pinching knife according to claim 1, wherein said handles have, at least in part, portions that are U-shaped in cross-section and the pivot pin is mounted through the adjoining U-shaped portions of both handles.

4. A pinching knife according to claim 2, wherein said handles have, at least in part, portions that are U-shaped in cross-section and the pivot pin is mounted through the adjoining U-shaped portions of both handles.

5. A pinching knife according to claim 1 wherein the pinching blade is in the form of a spatula and has a smaller width than the slicing blade.

6. A pinching knife according to claim 2 wherein the pinching blade is in the form of a spatula and has a smaller width than the slicing blade.

7. A pinching knife according to claim 3 wherein the pinching blade is in the form of a spatula and has a smaller width than the slicing blade.

8. A pinching knife according to claim 4 wherein the pinching blade is in the form of a spatula and has a smaller width than the slicing blade.

9. A pinching knife according to claim 3 wherein said resilient means urging the handles apart is a V-shaped spring arranged to straddle the pivot pin with the tips of its diverging legs bearing against the inner sides of the handles.

10. A pinching knife according to claim 4, wherein the spring urging the handles apart is a V-shaped spring arranged to straddle the pivot pin with the tips of its diverging legs bearing against the inner sides of the handles.

References Cited

UNITED STATES PATENTS

| 2,455,623 | 12/1948 | Stone | 30—123 |
| 2,601,766 | 7/1952 | Riddell et al. | 30—124 |
| 3,227,480 | 1/1966 | Hinkle | 294—16 |

FOREIGN PATENTS

| 402,191 | 9/1909 | France. |
| 666,218 | 9/1938 | Germany. |

OTHELL M. SIMPSON, *Primary Examiner.*

G. WEIDENFELD, *Assistant Examiner.*